Dec. 25, 1962  J. A. NOSLER  3,069,748
BULLET MAKING
Filed Oct. 1, 1956  4 Sheets-Sheet 1
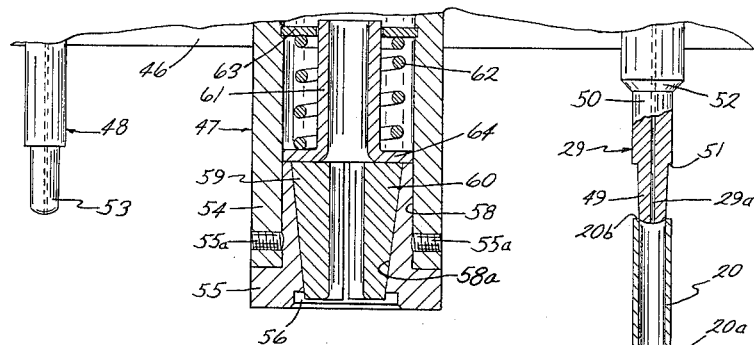
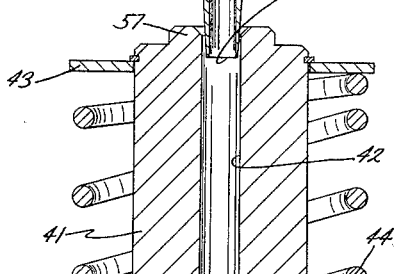
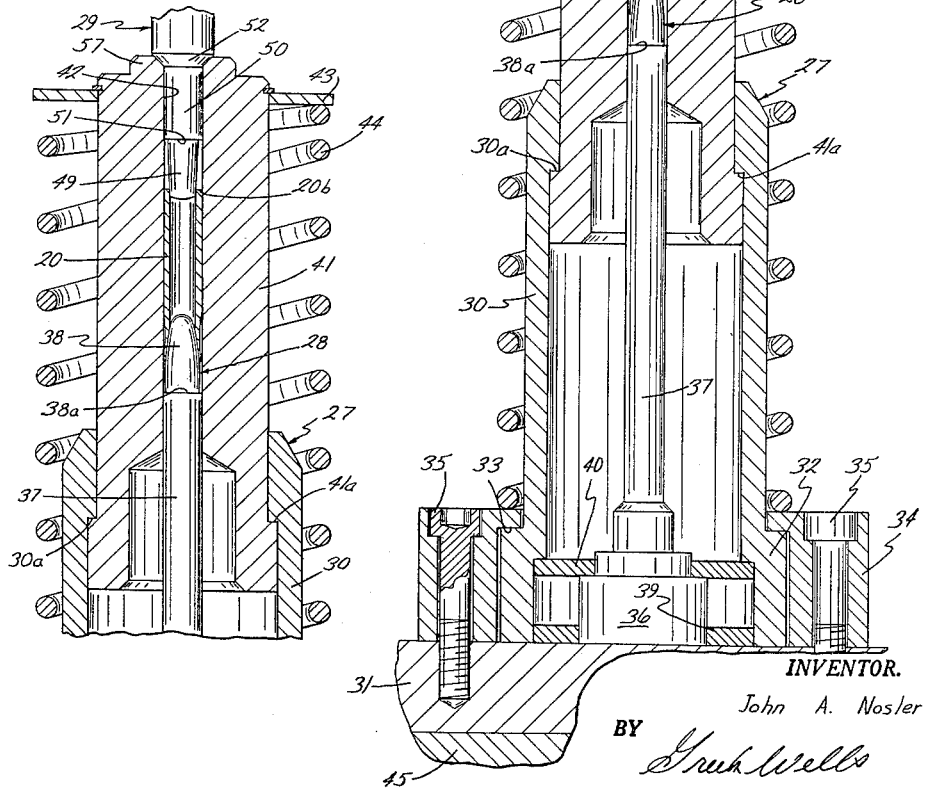
INVENTOR.
John A. Nosler
BY
Atty.

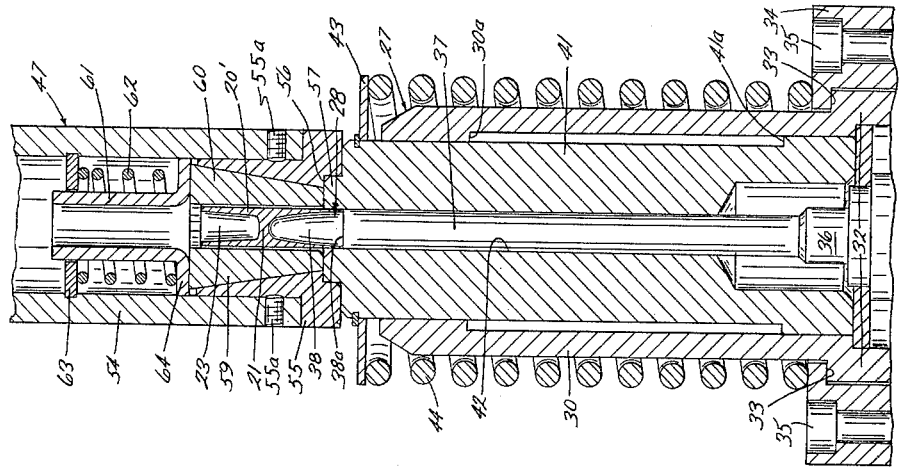
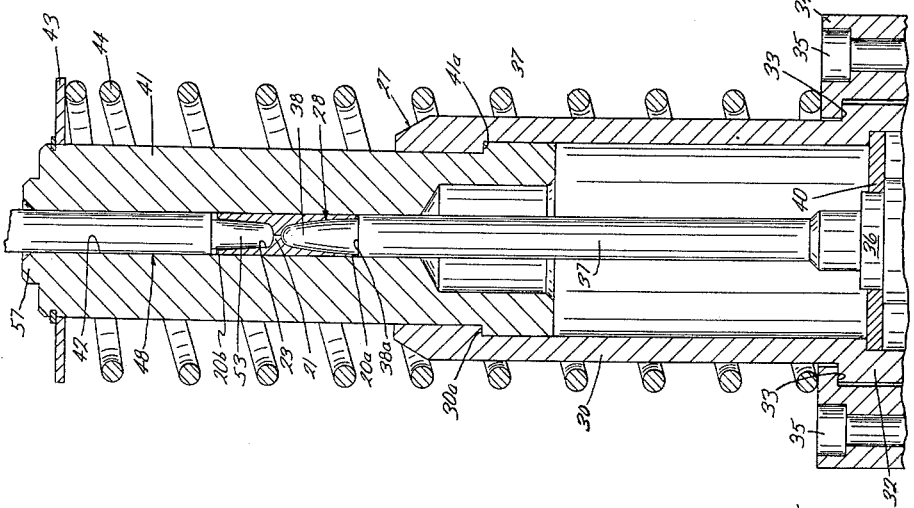
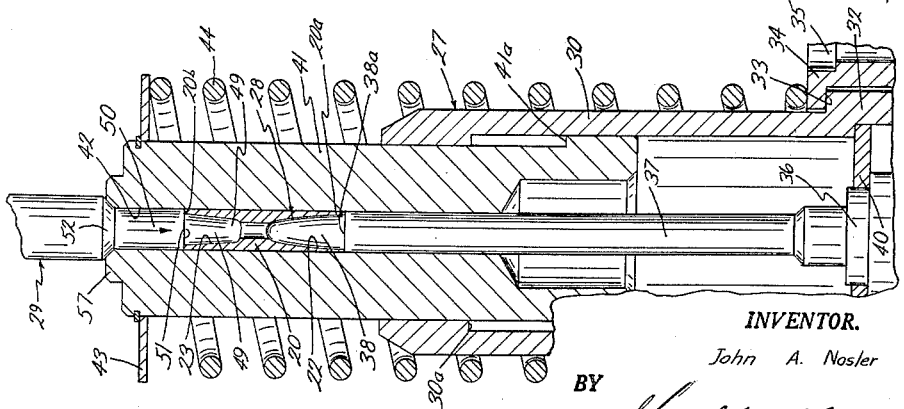

Dec. 25, 1962 J. A. NOSLER 3,069,748
BULLET MAKING
Filed Oct. 1, 1956 4 Sheets-Sheet 3
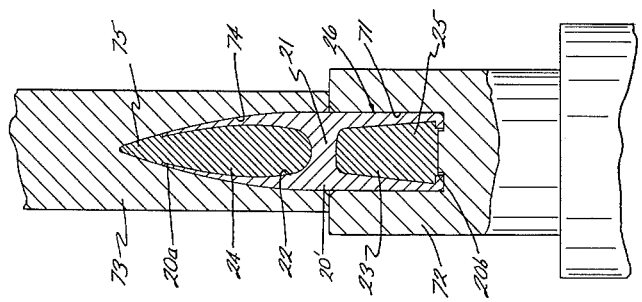
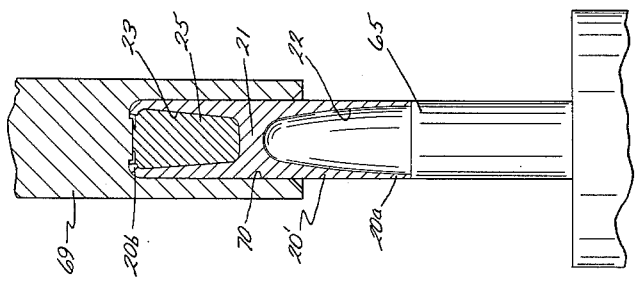
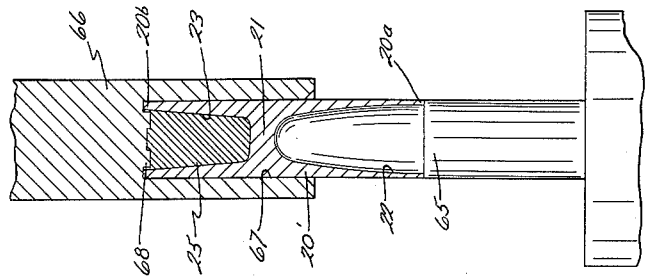
INVENTOR.
John A. Nosler
BY
*GreckWells*
Atty.

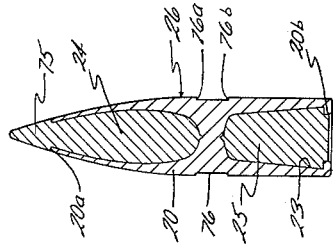
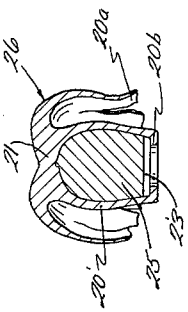
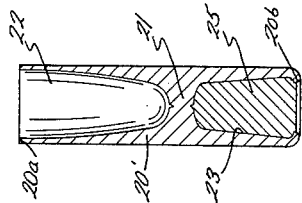
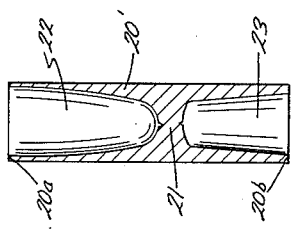
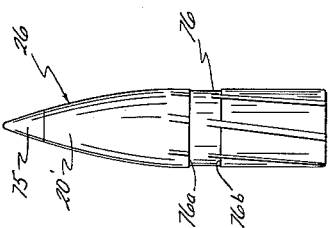
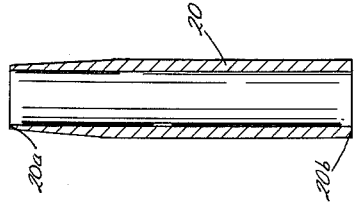
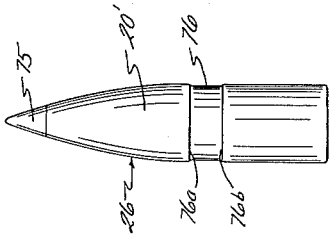
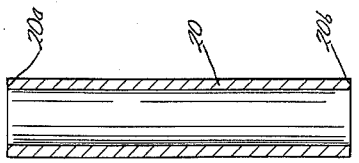

United States Patent Office 3,069,748
Patented Dec. 25, 1962

3,069,748
BULLET MAKING
John A. Nosler, Ashland, Oreg., assignor, by mesne assignments, to Nosler Partition Bullet Co., Inc., a corporation of Oregon
Filed Oct. 1, 1956, Ser. No. 613,025
6 Claims. (Cl. 29—1.23)

The present invention relates to improvements in making bullets.

In providing a satisfactory bullet for rifles which may be fired safely and truely from the rifle and which will exert a maximum killing effect on the target, several problems are involved. The common lead bullet comprising nothing more than a slug of lead shaped into a projectile is so soft that upon explosion of the charge in the cartridge, the bullet is deformed and expanded by the gas pressure and tends to wedge in the rifle barrel, thus reducing both its velocity and accuracy. Such a bullet also deforms readily upon striking the target, thus reducing its penetration. To overcome these difficulties, bullet manufacturers have produced bullets having hardened jackets of copper or other material. Such bullets, however, are not wholly satisfactory since they do not readily deform upon contact with the target, and tend to pass through the target without doing too much damage, thus exerting only a small shocking effect and allowing the target, if it is living, to continue relatively unaffected for a time.

It is a purpose of this invention to produce a bullet which is so constructed that it may expand slightly upon explosion of its motivating charge whereby to cushion the explosion and prevent gas leakage, and yet will not expand unduly and impair the velocity and accuracy of travel, and so that it will not disintegrate so completely upon impact as to unduly impair penetration, yet will distort sufficiently to produce a great shocking power upon the target.

I have found that a bullet which comprises a copper jacket having a partition therein intermediate its ends dividing the jacket into forward and rearward compartments and having lead slugs seated in the compartments, has the desired characteristics just described. Such a bullet properly produced, has sufficient resistance to expansion due to the strength of the copper jacket to insure proper travel through the rifle barrel, and yet, the lead slug in the rear compartment of the bullet jacket produces the desired cushioning effect upon explosion of the charge. The rear lead being wholly confined in the rear compartment, will not disintegrate upon impact and will produce satisfactory penetration. The front lead, however, will disintegrate and produce the desired shocking effect. In addition, the forward portion of the jacket will split and fold back in petal like sections to increase the shocking power of the bullet.

A further purpose of the present invention is to provide means and method to produce a partitioned jacket bullet having the hereinbefore described characteristics.

A still further purpose of the invention is to provide means and method of producing the partitioned jacket by controlled cold working the material whereby to increase the strength of the jacket adjacent the partition and the rearward portion in order to decrease the distortion in these portions while leaving the forward portion relatively soft to permit splitting and folding back thereof upon impact.

The nature and advantages of the invention will appear more clearly from the following description and the accompanying drawings wherein a preferred form of the invention is shown. It should be understood, however, that the description and drawings are illustrative only and are not intended to limit the invention except insofar as it is limited by the claims:

In the drawings:

FIGURE 1 is a vertical cross sectional view of die and punch means suitable for forming the partitioned bullet jacket;

FIGURE 2 is a fragmentary sectional view similar to FIGURE 1, showing the punches being forced toward each other in the die and in a section of copper tubing from which the partitioned jacket is formed;

FIGURE 3 is a view similar to FIGURE 1, showing the manner in which the punches upset the copper tube to form the partition;

FIGURE 4 is a view similar to FIGURE 1, showing a finishing punch completing the partition forming operation;

FIGURE 5 is a view similar to FIGURE 1, showing the finished partitioned jacket being ejected from the die;

FIGURE 6 is a fragmentary sectional view illustrating punch and die means tamping a rear lead into the partitioned jacket;

FIGURE 7 is a view similar to FIGURE 6, showing punch and die means crimping the rear edge of the partitioned jacket;

FIGURE 8 is a view similar to FIGURE 6, illustrating the final formation of the bullet;

FIGURE 9 is a cross sectional view of a section of copper tubing from which the partition is formed;

FIGURE 10 is a cross sectional view illustrating the tapering of one end of the tubing, the first step in the bullet forming operation;

FIGURE 11 is a cross sectional view of the tube after the partition has been formed;

FIGURE 12 is a view of the jacket with the rear lead installed;

FIGURE 13 is a cross sectional view of the finished bullet;

FIGURE 14 is an elevational view of the finished bullet;

FIGURE 15 is an elevational view of the bullet after firing, illustrating the rifling grooves; and FIGURE 16 is a cross sectional view of the bullet after impact, illustrating the manner in which the front portion of the jacket splits and folds back.

My improved partitioned jacket bullet is formed of a section of copper tubing and two slugs of relatively soft lead. In making the bullet a section of copper tubing, such as that indicated at 20 in FIGURE 9, is cut to a length slightly longer than the desired length of the finished jacket. After the tubing 20 has been cut to the desired length, it is upset or deformed in such a way that partition 21 is produced intermediate the front end 20a and the rear end 20b of the tubing 20, as shown in FIGURE 11. This construction provides a front pocket 22 and a rear pocket 23 in the jacket 20' formed from the tubing 20 into which lead slugs 24 and 25 are inserted. When the slugs 24 and 25 are in place, the jacket 20' is pressed into a projectile shape to form the finished bullet indicated at 26 in FIGURE 14.

Referring now to FIGURES 1–5 of the drawings, I have shown in FIGURE 1, a die 27 which together with a pair of opposed punches 28 and 29, is capable of deforming the tubing 20 to produce the partition 21. The die 27 comprises first a sleeve 30 which rests upon a slide plate 31. The sleeve 30 has an enlarged portion 32 adjacent its lower end which terminates in a shoulder 33. A clamping ring 34 is provided around the sleeve 30 and engages the shoulder 33 to secure the sleeve 30 to the slide plate 31. The ring 34 is bolted to the plate 31 by bolts 35. Inside the sleeve 30, the lower punch 28 is positioned. The punch 28 comprises a base member 36 which rests on the slide plate 31 and a vertical shaft 37 which extends upwardly from the base 36. A punch head 38 is formed at the top of the shaft 37. A shoulder 38a is formed at the base of the head 38. The punch 28 is held in proper alignment within the sleeve 30 by washers 39 and 40.

A movable die cylinder 41 is mounted within the sleeve 30 for vertical sliding movement. The cylinder 41 has a center bore 42 therein which is substantially equal in diameter to the shaft 37 of the lower punch 28. This bore slidably receives the shaft 37. The cylinder 41 has a washer 43 fixed thereto adjacent the upper end, and a coil spring 44 is provided around the cylinder 41 and sleeve 30 between the calmp ring 34 and the washer 43. The spring 44 urges the cylinder upwardly from the sleeve 30. Interconnecting shoulders 30a and 41a on the sleeve 30 and the cylinder 41 limit the upward movement of the cylinder 41 within the sleeve 30. With this construction, the die cylinder 41 is normally held at its uppermost position within the sleeve 30, but may move down against the spring 44 until its lower edge engages the upper spacing washer 40. The purpose of this slidable construction will appear later herein.

The slide plate 31 which supports the die 27 and the lower punch 28, is itself mounted for horizontal sliding movement upon the lower jaw 45 of a vertical press (not shown). The upper jaw or ram 46 of the press carries the upper punch 29, as well as an ejecting mechanism 47 and a finishing punch 48, each of which will be described later herein. The punch 29, ejecting mechanism 47 and finishing punch 48 are mounted on the ram 46 in horizontally spaced relation. The slide plate 31 is adapted to move the die 27 beneath each of the members 29, 47 and 48 during the formation of the partition 21 in the tube section 20, as hereinafter described.

To produce a partitioned jacket 20′, the tube section 20 is first cut to a length slightly longer than the desired length of the finished jacket. The tubing 20 must be of a diameter equal to the diameter of the finished bullet 26 and must have a wall thickness slightly greater than that desired in the finished jacket 20′, to provide sufficient metal to form the partition 21 upon upsetting. The tube section 20 is placed in the bore 42 of the cylinder 41 and the ram 46 of the press is moved down to lower the upper punch 29. The punch 29 comprises a head portion 49, shaped as shown in FIGURE 1 with a slightly rounded tip and tapering sides. The head portion 49 is supported on a shaft 50 which is substantially equal in diameter to the bore 42. A shoulder 51 is formed between the head 49 and shaft 50. The punch 29 has a central aperture 29a therein to allow entrapped air to escape as the punch is forced down. As the punch 29 is moved downwardly, the tip of the head 49 engages the rear end 20b of the tube 20 and pushes it down in the bore and into contact with the head portion 38 of the lower punch 28. At this position, the shaft 50 is partially within the bore 42 to insure that the punch 29 is properly centered. Continued downward movement of the punch 29 forces the heads 38 and 49 into the tube 20, as shown in FIGURES 2 and 3. Both heads 38 and 49 are somewhat larger in diameter than the interior diameter of the tube 20, so their movement into the tube 20 expands the interior of the ends 20a and 20b, upsetting some of the wall material. When the heads 38 and 49 have fully entered the tube 20, the shoulders 38a and 51 engage the ends 20a and 20b of the tube 20 and force them together, thereby upsetting the walls of the tube 20 intermediate the heads 38 and 49. Since the tube 20 is confined against outward radial movement by the cylinder 41 and since the heads 38 and 49 confine the end portions against inward radial movement, the upset metal must flow into the space between the heads to form the partition 21.

It is a well known fact that cold working copper hardens the copper. Therefore, the upsetting of the walls of the tube 20 hardens the tube 20, the amount of hardening in any area being proportional to the metal distortion in that area. Inasmuch as the end portions of the tube 20 are confined between the heads 38 and 49, the major distortion and therefore the major hardening occurs in the area between the punch heads. Since, as previously described, it is desirable to leave the front portion of the jacket 20 relatively soft so that it may split and fold back in petals upon impact with the target, it is not desirable to work the walls of the tube 20 to a great extent near the front end 20a of the tube 20. However, the walls of the tube 20 adjacent the front edge must be thinned out considerably. In order to accomplish this thinning out without substantial working, the tube 20 is tapered on the outside from the end 20a back for about one third of its length, as best shown in FIGURES 1 and 10, before it is inserted in the bore 42. With this taper cut into the tube wall the insertion of the lower punch head 38 merely stretches the metal and converts the taper from the outside to the inside of the tube 20, rather than upsetting the metal to a great extent. This stretching is desirable in that it stresses the walls and makes them more susceptible to splitting. FIGURE 2 illustrates the manner in which the taper adjacent the end 20a of the tube 20 is converted from the outside of the tube to the inside.

I have found that in performing the deformation of the tube 20 described above, it is almost impossible to force the tube 20 down over the head 38 of the stationary punch 28 if the cylinder 41 is held stationary also. I therefore provide a second shoulder 52 on the shaft 50 of the upper punch 29 which will engage the top of the cylinder 41 after the punch 29 has been lowered far enough to seat both punches firmly in the ends of the tube. When the shoulder 52 is engaged with the top of the cylinder 41, further downward movement of the punch 29 causes the cylinder 41 to move down within the sleeve 30. This downward movement of the cylinder 41 assists in pulling the tube 20 over the head 38 of the lower punch 28.

After the punch 29 has completed its stroke and has been withdrawn, the slide plate 31 is moved until the die 27 is aligned with the finishing punch 48. This punch 48 has a head 53 shaped substantially like the head 49 of the punch 29 except that the head 53 is somewhat narrower so that it does not engage the side walls of the tube 20, but merely engages the partition 21 when lowered and gives it a finishing blow to insure that it is properly formed as shown in FIGURE 4. The use of the finishing punch 48 is not absolutely essential since the punch 29 forms a substantially complete partition 21, however, it has been found that increased punch and die life can be obtained if the punch 48 is used to make the finishing deformation which closes the partition 21, rather than to force the punch 29 to do the complete job in one stroke.

When the finishing punch 48 has completed its stroke, the slide plate 31 is again moved until the die 27 is aligned beneath the ejecting mechanism 47. This mechanism 47 is then used to withdraw the completed partitioned jacket 20′ from the bore 42. The mechanism 47, best shown in FIGURES 1 and 5, comprises a sleeve 54 which is fixed to the ram 46 of the press unit. The sleeve 54 has a finger retaining nipple 55 secured at the lower end of a cylindrical aperture 58 by screws 55a. The nipple 55 has a die centering recess 56 therein which is adapted to receive a centering boss 57 on the cylinder 41. The nipple 55 also has a cone-shaped aperture 58a therein communicating with the recess 58, in which a pair of semi-cylindrical jaws 59 and 60 are positioned. The outer surfaces of the jaws 59 and 60 are cone-shaped also, so that downward movement of the jaws 59 and 60 in the nipple 55 moves them together, while upward movement allows them to spread apart. The jaws are pressed downwardly in the aperture 58a by a sleeve 61. The sleeve 61 is spring tensioned by a coil spring 62 interposed between a washer 63 fixed to the sleeve 54 and a flange 64 on the inner sleeve 61. The spring 62 normally holds the jaws 59 and 60 down so their lower ends protrude into the recess 56. However, when the ejecting mechanism 47 is lowered over the die 27, the boss 57 on the cylinder 41 enters the recess 56 and forces the jaws 59 and 60 upwardly and hence apart, and in position to receive the jacket 20' therebetween. In order to remove the jacket 20' from the die 27, the mechanism 47 is moved downwardly until the cylinder 41 is depressed to its full limit in the sleeve 30. This exposes the jacket 20' above the top of the cylinder 41 and allows the jaws 59 and 60 to receive it therebetween, as shown in FIGURE 5. When the mechanism 47 is retracted, the jaws are closed on the jacket 20' and it is withdrawn from the die 27. Withdrawal of successive jackets 20' forces the jacket 20' up through the inner sleeve 61 until it reaches a discharge port (not shown) in the sleeve 54.

After the jacket 20' has been formed as hereinbefore described, it is shaped as shown in FIGURE 11 with the partition 21 intermediate the front and rear ends, and with a front pocket 22 and a rear pocket 23. The next step in the formation of the finished bullet 26 is to install the rear lead slug 25 in the pocket 23. This is accomplished by placing the jacket 20' upon a punch 65 shaped similarly to the punch 28, as shown in FIGURE 6, with the rear pocket 23 facing upwardly. The rear lead slug 25 is dropped into the pocket 23 and tamped in place by a vertically movable die 66 which has a recess 67 therein proportioned to receive the jacket 20'. A bottom boss 68 in the recess 67 tamps the lead 25 into place.

After the lead 25 has been tamped, the punch 65 is moved beneath a die 69, shown in FIGURE 7, which is similar to the die 66 except that it has a recess 70, the bottom corners of which are rounded so as to crimp the end 20b of the jacket 20' around the lead 25, whereby to retain it in place.

After the rear lead 25 has been installed, the jacket 20' is set into a recess 71 in a die 72 in position so that its front pocket 22 faces upwardly. The front lead 24 is dropped into the pocket 22 and a vertically movable die 73 is moved down over the jacket 20'. The die 73 has a tapered recess 74 therein which is formed in the desired nose shape of the finished bullet. The die 73 is pressed down onto the die 72 to finish the forming of the bullet, and swedges the front portion of the jacket 20' into a tapered shape, at the same time flowing the front lead 24 upwardly to form a nose portion 75 above the jacket 20'. The recess 71 in the lower die 72 is substantially sharp cornered, so that the rear end of the bullet is also finish formed into a substantially sharp cornered butt end.

With the finished bullet 26 formed as described, the jacket 20' varies in hardness throughout its length, due to the varying amounts of cold working at the several points. The hardest portion of the jacket 20' is the portion immediately adjacent to and including the partition 21. This portion of the metal experiences the most distortion. The front portion of the jacket 20' surrounding the front lead 24 is the softest portion of the jacket, it having received the least working. The portion of the jacket 20' surrounding the rear lead 25 is also relatively soft since the walls of the rear pocket 23 experience only an ironing during the upsetting operation. The rear edge 20b, however, is considerably hardened, since it receives considerable working in being crimped over the rear lead 25.

Since the hardest portion of the jacket 20' is that portion adjacent the partition 21, and since the entire cross section of the bullet 26 is hardened copper at this point, I have found it necessary to cut a relief band such as indicated at 76 in FIGURES 13, 14 and 15, in the surface of the jacket around the partition 21. The relief band 76 is tapered slightly from the front edge 76a to the rear edge 76b, the front portion being cut deepest. The purpose of the relief band 76 is to eliminate the necessity of forcing the hardened and uncushioned portion of the jacket 20' through the rifling of the gun barrel when the bullet 26 is fired. The band 76 is therefore cut deep enough at the front edge 76a that the rifling ridges in the gun barrel will not engage. The taper in the relief band 76, however, allows the rifling ridges to contact at about the center of the band 76 to insure proper accuracy. The relatively soft portion of the jacket 20' rearward of the band 76 is not reduced in diameter, so it is fully engaged by the rifling ridges, as is illustrated in FIGURE 15.

My improved partitioned jacket bullet 26, produced as hereinbefore described provides an extremely satisfactory game bullet. The copper jacket 20' provides the necessary resistance to expansion upon firing and the lead slugs 24 and 25 provide the necessary cushioning and disintegrating effects. It will be noted that the punch heads 38 and 49 which form the partition 21 in the jacket 20' are tapered and rounded at their tips, thereby forming the walls of the front and rear pockets 22 and 23 in such a manner that they thicken as they approach the partition, in smooth flowing curves, thereby increasing in strength adjacent the partition 21. With this construction the "mushrooming" or folding back of the soft front portion of the jacket 20' upon impact is controlled to produce the the maximum shocking effect. The increased thickness of the front wall adjacent the partition prevents the petals of metal from folding back too tightly or breaking off, thereby maintaining a maximum diameter for maximum shocking effect. The thickened walls of the rear pocket 23 adjacent the partition 21 prevent the rear lead 25 from expanding too much or breaking through, as it is driven forward upon explosion of the charge behind it. With the particular construction described, there are no sharp corners to encourage cracking or breaking, either upon firing or upon impact, so the bullet 26 maintains a unitary structure throughout its use.

It should be understood, of course, that while I have shown the partition 21 formed substantially centrally of the ends of the jacket 20', it may be formed either forwardly or rearwardly of this point to adapt the bullet 26 for different purposes. To increase the penetration and reduce the shocking power of the bullet 26, the partition 21 may be moved forwardly. To increase the shocking power and reduce penetration, it may be moved rearwardly. In any case, the construction and operation of the bullet 26 are substantially the same.

It is believed that the value and advantages of the invention appear clearly from the foregoing description and the accompanying drawings.

Having thus described my invention, I claim:

1. A method of forming bullets comprising first tapering one end of a cylindrical metal tube, expanding the interior of the end portions of the tube and forcing the ends of the tube together to upset the tube and form a partition therein intermediate the ends thereof, inserting lead slugs into the tube at each end, swedging the originally tapered end into a tapered nose, and crimping the opposite end of the tube over the lead slug therein.

2. A method of forming bullets comprising tapering one end of a cylindrical metal tube whereby to reduce the wall thickness thereof, expanding the interior of the end portions of the tube and forcing the ends of the tube together to upset the tube and form a partition therein intermediate the ends thereof, inserting lead slugs into the tube at each end, pressing the originally tapered end into a tapered nose, crimping the opposite end of the tube over the lead slug therein, and reducing the diameter of the tube adjacent the partition to form a relief band therearound.

3. A method of forming bullets comprising first tapering the outer surface of one end of a cylindrical metal tube, expanding the interior of the end portions of the tube and forcing the ends of the tube together to upset the tube and form a partition therein intermediate the ends thereof, inserting lead slugs into the tube at each end, pressing the originally tapered end into a tapered nose, crimping the opposite end over the lead slug therein, and reducing the diameter of the tube adjacent the partition to form a relief band therearound.

4. A method of forming bullets comprising first tapering the outer surface of one end of a cylindrical metal tube, expanding the interior of the end portions of the tube and forcing the ends of the tube together to upset the tube and form a partition therein intermediate the ends thereof, inserting lead slugs into the tube at each end, pressing the originally tapered end into a tapered nose, crimping the opposite end over the lead slug therein.

5. A method of forming a bullet jacket comprising first tapering one end of a cylindrical metal tube, confining the tube against outward radial movement, expanding the interior of the end portions of the tube and confining them against inward radial movement, then forcing the ends of the tube together while it is so confined to upset the tube material intermediate the end portions inwardly to form a partition between the end portions of the tube.

6. A method of forming bullets comprising first tapering one end of a cylindrical metal tube, confining the tube against outward radial movement, expanding the interior of the end portions of the tube and confining them against inward radial movement, then forcing the ends of the tube together while it is so confined to upset the tube material intermediate the end portions inwardly to form a partition between the end portions of the tube, then filling the end portions of the tube with a softer material, pressing the originally tapered end into a tapered nose, crimping the opposite end to confine the softer material therein, and reducing the diameter of the tube around the partition to form a relief band therearound.

References Cited in the file of this patent

UNITED STATES PATENTS

| | | |
|---|---|---|
| 325,692 | Parker | Sept. 8, 1885 |
| 338,502 | Gerald | Mar. 23, 1886 |
| 472,504 | Kitsmiller | Apr. 5, 1892 |
| 493,519 | Richards | Mar. 14, 1893 |
| 1,059,212 | Ross | Apr. 15, 1913 |
| 1,149,485 | Wilcox | Aug. 10, 1915 |
| 1,234,653 | Gaynor | July 24, 1917 |
| 1,447,478 | Koshollek | Mar. 6, 1923 |
| 1,602,550 | Pierce | Oct. 12, 1926 |
| 1,681,295 | Johnson | Aug. 21, 1928 |
| 1,718,630 | Brown | June 25, 1929 |
| 1,754,178 | Muir | Apr. 8, 1930 |
| 1,767,308 | Phillips | June 24, 1930 |
| 1,873,453 | Mogford | Aug. 23, 1932 |
| 1,967,416 | Leussler | July 24, 1934 |
| 2,003,438 | Guignet | June 4, 1935 |
| 2,089,912 | Biginelli | Aug. 10, 1937 |
| 2,583,270 | Lynall | Jan. 22, 1952 |

FOREIGN PATENTS

| | | |
|---|---|---|
| 719,483 | Germany | Mar. 12, 1942 |
| 770,246 | France | June 25, 1934 |